US007052766B2

(12) United States Patent
Zang et al.

(10) Patent No.: US 7,052,766 B2
(45) Date of Patent: May 30, 2006

(54) FUNCTIONALIZED HALOGENATED POLYMERS FOR MICROENCAPSULATION

(75) Inventors: Hongmei Zang, Sunnyvale, CA (US); Huiyong Paul Chen, San Jose, CA (US); Mahmoud-Zohdi Armoush, Santa Clara, CA (US); Denis Leroux, Salem, MA (US); Rongchi Yu, Glenmont, NY (US); Rong-Chang Liang, Cupertino, CA (US)

(73) Assignee: SiPix Imaging, Inc., Fremont, CA (US)

(*) Notice: Subject to any disclaimer, the term of this patent is extended or adjusted under 35 U.S.C. 154(b) by 254 days.

(21) Appl. No.: 10/335,051

(22) Filed: Dec. 31, 2002

(65) Prior Publication Data
US 2003/0207963 A1 Nov. 6, 2003

Related U.S. Application Data

(60) Provisional application No. 60/345,934, filed on Jan. 3, 2002.

(51) Int. Cl.
*B32B 15/02* (2006.01)
*G03C 1/72* (2006.01)
*C25B 9/04* (2006.01)

(52) U.S. Cl. .................. 428/402.24; 428/403; 430/109; 430/111; 430/138; 528/48; 528/60; 528/65; 528/76; 528/289; 528/290; 528/332; 528/373; 528/401; 528/422; 528/423

(58) Field of Classification Search .................. 528/48, 528/60, 65, 76, 289, 290, 332, 373, 401, 528/422, 423; 428/402.24, 403; 430/109, 430/111, 138; 264/4.3, 4.7; 204/600
See application file for complete search history.

(56) References Cited

U.S. PATENT DOCUMENTS

| 3,668,106 | A | 6/1972 | Ota .............................. 204/299 |
| 3,960,814 | A | 6/1976 | Cochoy .................... 260/47 R |
| 4,071,430 | A | 1/1978 | Liebert ....................... 204/299 |
| 4,085,137 | A | 4/1978 | Mitsch et al. ......... 260/561 HL |
| 4,093,534 | A | 6/1978 | Carter et al. ................ 350/355 |
| 4,285,801 | A | 8/1981 | Chiang ....................... 204/299 |
| 4,620,916 | A * | 11/1986 | Zwemer et al. ......... 204/299 R |
| 4,680,103 | A | 7/1987 | Beilin Solomon I. et al. ... 204/299 |
| 4,891,245 | A | 1/1990 | Micale ..................... 427/213.3 |
| 4,999,333 | A | 3/1991 | Usami ........................ 349/209 |
| 5,204,185 | A | 4/1993 | Seitz ..................... 428/402.21 |
| 5,380,362 | A | 1/1995 | Schubert ..................... 106/493 |
| 5,403,518 | A | 4/1995 | Schubert ..................... 252/572 |
| 5,443,908 | A | 8/1995 | Matsushita et al. .... 428/402.24 |
| 5,573,711 | A | 11/1996 | Hou et al. ................... 252/572 |
| 5,914,806 | A | 6/1999 | Gordon, II et al. ......... 359/296 |
| 5,930,026 | A | 7/1999 | Jacobson et al. ........... 359/296 |
| 5,961,804 | A | 10/1999 | Jacobson et al. ........... 204/606 |
| 6,017,584 | A | 1/2000 | Albert et al. ............. 427/213.3 |
| 6,162,521 | A | 12/2000 | Falcone ..................... 428/65.4 |
| 6,184,856 | B1 * | 2/2001 | Gordon, II et al. ......... 345/107 |
| 6,187,954 | B1 | 2/2001 | Falcone ...................... 564/136 |
| 6,261,483 | B1 | 7/2001 | Frank et al. ................. 264/4.1 |
| 2002/0126249 | A1 | 9/2002 | Liang et al. ................ 349/187 |
| 2002/0182544 | A1 | 12/2002 | Chan-Park et al .......... 430/311 |

FOREIGN PATENT DOCUMENTS

| EP | 336666 | | 10/1989 |
| EP | 562344 | | 9/1993 |
| WO | WO 95/33085 | * | 1/1995 |
| WO | WO 01/067170 | * | 9/2001 |
| WO | WO 02/01281 | * | 1/2002 |
| WO | WO 02/056097 | * | 7/2002 |
| WO | WO 02/65215 | * | 8/2002 |

OTHER PUBLICATIONS

Hopper, M.A. and Novotny, V., "An Electrophoretic Display, It's Properties, Model, and Addressing" IEEE Transactions on Electron Devices, vol. ED-26, No. 8, Aug. 1979, pp. 1148-1152.
Dalisa, A.L., "Electrophoretic Display Technology", IEEE Transactions of Electron Devices, Jul. 1997, pp. 827-834.
Murau, P., et al., "The Understanding and Elimination of Some Suspension Instabilites in an Electrophoretic Display", J. Appl. Phys., 49(9), (1978).
Caporiccio, G., et al., "Low Temperature Elastomeric Polyamides Containing Perfluorinated Polyether Building Blocks", Makromol. Chem. 184, 935-947 (1983).
Malik, A.A., et al., "Synthesis of Fluorinated Diisocyanates", J. Org. Chem. 1991, 56, 3043-3044.
Schmidt, S., et al, *Handbook of Imaging Materials*, Marcel Dekker, Inc., 6:227-252.*
Fowkes F. et al., "Mechanism of Electric Charging of Particles in Nonaqueous Liquids", *Colloids and Surfaces in Reprographic Technology*, 307-324.*
Kondo, A., *Microcapsule Processing and Technology*, Marcel Dekker, Inc., 1979, (entire book).*
Liang, R.C et al., "Microcup Electrophoretic Displays by Roll-to-Roll Manufacturing Processes" *Proc. of the IDW'02*, International Conference Center Hiroshima (2002).*

* cited by examiner

*Primary Examiner*—Samuel A. Acquah
(74) *Attorney, Agent, or Firm*—Howrey LLP

(57) ABSTRACT

The present invention is directed to a novel reactive protective colloid system suitable for stabilizing an electrophoretic display in which a halogenated solvent, particularly a fluorinated, more particularly a perfluorinated, solvent, or a mixture thereof, is used as the dielectric solvent.

47 Claims, No Drawings

FUNCTIONALIZED HALOGENATED POLYMERS FOR MICROENCAPSULATION

CROSS-REFERENCE TO RELATED APPLICATION

This application claims the benefit of U.S. Provisional Application Ser. No. 60/345,934, filed Jan. 3, 2002, the content of which is incorporated herein by reference in its entirety.

BACKGROUND OF THE INVENTION

Field of the Invention

The electrophoretic display (EPD) is a non-emissive device based on the electrophoresis phenomenon influencing charged pigment particles suspended in a colored dielectric solvent. This general type of display was first proposed in 1969. An EPD typically comprises a pair of opposed, spaced-apart plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively are needed to drive the displays. In contrast, an array of thin film transistors (TFTs) on the bottom plate and a common, non-patterned transparent conductor plate on the top viewing substrate are required for the active type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time.

To view a reflective EPD, an external light source is needed. For applications to be viewed in the dark, either a backlight system or a front pilot light system may be used. A transflective EPD equipped with a backlight system is typically preferred over a reflective EPD with a front pilot light because of cosmetic and uniformity reasons. However, the presence of light scattering particles in typical EPD cells greatly reduces the efficiency of the backlight system. A high contrast ratio in both bright and dark environments, therefore, is difficult to achieve for traditional EPDs.

A transmissive EPD is disclosed in U.S. Pat. No. 6,184,856 in which a backlight, color filters and substrates with two transparent electrodes are used. The electrophoretic cells serve as a light valve. In the collected state, the particles are positioned to minimize the coverage of the horizontal area of the cell and allow the backlight to pass through the cell. In the distributed state, the particles are positioned to cover the horizontal area of the pixel and scatter or absorb the backlight. However, the backlight and color filter used in this device consume a great deal of power and therefore are not desirable for hand-held devices such as PDAs (personal digital assistants) and e-books.

EPDs of different pixel or cell structures have been reported previously, for example, the partition-type EPD (M.A. Hopper and V. Novotny, IEEE Trans. Electr. Dev., Vol. ED 26, No. 8, pp. 1148–1152 (1979)) and the microencapsulated EPD (U.S. Pat. Nos. 5,961,804 and 5,930,026). However both types have their own problems as noted below.

In the partition-type EPD, there are partitions between the two electrodes for dividing the space into smaller cells in order to prevent undesired movement of the particles such as sedimentation. However, difficulties are encountered in the formation of the partitions, the process of filling the display with an electrophoretic fluid, enclosing the fluid in the display and keeping the fluids of different colors separated from each other.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules are typically prepared in an aqueous solution, and to achieve a useful contrast ratio, their mean particle size is relatively large (50–150 microns). The large microcapsule size results in poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge-controlling agent is often needed in this type of EPDs. However, the microencapsulation process in an aqueous solution imposes a limitation on the type of charge-controlling agents that can be used. Other drawbacks associated with the microcapsules system include poor resolution and poor addressability for color applications.

An improved EPD technology was recently disclosed in co-pending applications, U.S. Ser. No. 09/518,488, filed on Mar. 3, 2000 (corresponding to WO 01/67170 published on Sep. 13, 2001), U.S. Ser. No. 09/759,212, filed on Jan. 11, 2001 (corresponding WO02/56097), U.S. Ser. No. 09/606,654, filed on Jun. 28, 2000 (corresponding WO02/01281) and U.S. Ser. No. 09/784,972, filed on Feb. 15, 2001 (corresponding to WO02/65215), all of which are incorporated herein by reference. The improved EPD comprises isolated cells formed from microcups of well-defined shape, size and aspect ratio and filled with charged pigment particles dispersed in a dielectric solvent, preferably a fluorinated solvent. The filled cells are individually sealed with a polymeric sealing layer, preferably formed from a composition comprising a material selected from a group consisting of thermoplastics, thermosets and their precursors.

The microcup structure enables a format flexible and efficient roll-to-roll continuous manufacturing process for the EPDs. The displays can be prepared on a continuous web of a conductor film such as ITO/PET by, for example, (1) coating a radiation curable composition onto the ITO/PET film, (2) making the microcup structure by a microembossing or photolithographic method, (3) filling the microcups with an electrophoretic fluid and sealing the microcups, (4) laminating the sealed microcups with the other conductor film and (5) slicing and cutting the display into a desirable size or format for assembling.

One advantage of this EPD design is that the microcup wall is in fact a built-in spacer to keep the top and bottom substrates apart at a fixed distance. The mechanical properties and structural integrity of this type of displays are significantly better than any prior art displays including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive, which would limit and predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut into almost any dimensions without the risk of damaging the display performance due to the loss of display fluid in the active areas. In other words, the microcup structure enables a format flexible display manufacturing process, wherein the process produces a continuous output of displays in a large sheet format which can be cut into any desired sizes. The isolated microcup or cell structure is particularly important when cells are filled with fluids of different specific properties such as colors and switching rates. Without the microcup structure, it will be very difficult to prevent the fluids in adjacent areas from intermixing or being subject to crosstalk during operation.

For applications to be viewed in dark environments, the microcup structure effectively allows the backlight to reach the viewer through the microcup walls. Unlike traditional EPDs, even a low intensity backlight is sufficient for users to view in the dark the transflective EPDs based on the microcup technology. A dyed or pigmented microcup wall may be used to enhance the contrast ratio and optimize the intensity of backlight transmitted through the microcup EPDs. A photocell sensor to modulate the backlight intensity might also be used to further reduce the power consumption of such EPDs.

The microcup EPDs may have the traditional up/down switching mode, the in-plane switching mode or the dual switching mode. In the display having the traditional up/down switching mode or the dual switching mode, there are a top transparent electrode plate, a bottom electrode plate and a plurality of isolated cells enclosed between the two electrode plates. In the display having the in-plane switching mode, the cells are sandwiched between a top transparent insulator layer and a bottom electrode plate.

The electrophoretic dispersions may be prepared according to methods well known in the art, such as U.S. Pat. Nos. 6,017,584, 5,914,806, 5,573,711, 5,403,518, 5,380,362,4,680,103, 4,285,801, 4,093,534, 4,071,430, and 3,668,106. See also *IEEE Trans. Electron Devices*, ED-24, 827 (1977), and *J. Appl. Phys.* 49(9), 4820 (1978).

The charged primary color particles are usually white, and may be organic or inorganic pigments, such as $TiO_2$. The particles may also be colored. The particles should have acceptable optical characteristics, should not be swollen or softened by the dielectric solvent and should be chemically stable.

Suitable charged pigment dispersions may be manufactured by grinding, milling, attriting, microfluidizing and ultrasonic techniques. For example, pigment particles in the form of a fine powder may be added to a suitable dielectric solvent and the resulting mixture is ball milled or attrited for several hours to break up the highly agglomerated dry pigment powder into primary particles.

However, a common problem associated with electrophoretic dispersions is sedimentation or creaming of the pigment particles. This problem may be eliminated by microencapsulating or coating the particles with suitable polymers to match the specific gravity to that of the dielectric solvent. Microencapsulation of the pigment particles may be accomplished either chemically or physically. Typical microencapsulation processes include interfacial polymerization, in-situ polymerization, phase separation, coacervation, electrostatic coating, spray drying, fluidized bed coating and solvent evaporation. A process involving (1) dispersing pigment particles in a non-aqueous polymer solution, (2) emulsifying the dispersion in an aqueous solution containing surfactants, (3) removing the organic solvent and (4) separating the encapsulated particles, was disclosed in U.S. Pat. No. 4,891,245 for the preparation of density matched particles for use in EPD applications. However, the use of an aqueous solution in the process results in major problems such as flocculation caused by separation of the particles from water and undesirable environmental sensitivity of the display.

Dispersion stability of the microencapsulated pigment particles may be achieved by two stabilization mechanisms, namely the Coulombic repulsion induced by the surface charge and the steric stabilization by adsorbed protective colloids on the surface of the microcapsules. Although both stabilization mechanisms are commonly used, the latter is particularly useful for non-aqueous dispersions.

The use of ionic fluorinated polymeric surfactants to stabilize electrophoretic pigment dispersions was taught in U.S. Pat. No. 4,285,801. However, the EPD pigment dispersions with an absorbed stabilizer still suffers from certain drawbacks, for example, flocculation or aggregation due to desorption of the loosely attached protective colloid in the electric field and deposition of the protective colloid onto the electrodes, particularly when a charged protective colloid is used. While the risk of flocculation or aggregation due to insufficient adsorption may be reduced by using an excessive amount of the protective colloid, this approach, however, often results in an increase in viscosity and a decrease in the display switching rate.

U.S. Pat. No. 5,914,806 teaches the preparation of electrophoretic pigment dispersions in typical hydrocarbon solvents using a polymeric stabilizers or protective colloids covalently bonded to the surface of pigments, particularly organic pigments. These pigments bear surface chemical functional groups capable of reacting with other functional groups on the polymeric stabilizer to form a covalent bond between the two. The teachings, however, do not include density-matched microencapsulated pigments, polymer coated pigments, inorganic pigments or organic pigments without chemical functional groups, or stabilized pigments, for use in halogenated, particularly perfluorinated, solvents.

Thus, there is still a need for protective colloids for stabilizing any type of pigments, particularly microencapsulated pigments and their applications in halogenated/fluorinated solvents such as those used in the microcup-based EPDs.

SUMMARY OF THE INVENTION

The present invention is directed to a novel reactive protective colloid system suitable for improving the performance of electrophoretic displays in which an electrophoretic fluid comprises a solvent which may be a halogenated solvent, particularly a fluorinated, more particularly a perfluorinated solvent, or a mixture thereof, or a mixture of a halogenated solvent and a non-halogenated solvent. The non-halogenated solvents include, but are not limited to, hydrocarbons, arylalkanes and alkylbenzenes, such as diphenyl ethane, dodecylbenzene and octylbenzene. These types of non-aqueous solvents often are used as the dispersing solvent for electrophoretic displays because of their high specific gravity, inertness, insensitivity to humidity, low dielectric constant, low viscosity and low vapor pressure.

The first aspect of the present invention is directed to a group of reactive halogenated protective colloids having at least one reactive functional group. The reactive halogenated protective colloids may be highly fluorinated protective colloids. Typical reactive functional groups include amino, hydroxy, thiol, isocyanate, thioisocyanate, epoxide, aziridine, a short-chain alkoxysilyl such as trimethoxy silyl, a carboxylic acid derivative such as acid anhydride or acid chloride, chloroformate and other reactive functional groups capable of undergoing interfacial polymerization/crosslinking. Protective colloids having more than one reactive functional group are useful.

The second aspect of the present invention is directed to the synthesis of the novel reactive protective colloids.

The third aspect of the present invention is directed to the use of the novel reactive protective colloids to prepare microcapsules having pigment particles dispersed therein by interfacial polymerization/crosslinking reactions.

The fourth aspect of the present invention is directed to the use of the novel reactive protective colloids to prepare the shell of microcapsules having pigment particles dispersed therein by interfacial polymerization/crosslinking reactions, followed by solvent evaporation and/or in-situ radical, ring opening or condensation polymerization/crosslinking reactions to harden the core of the particles.

The fifth aspect of the present invention is directed to the use of the novel reactive protective colloids in the preparation of microcapsules to enhance stability and switching performance of the EPD dispersion and to control the particle/capsule size and size distribution.

DETAILED DESCRIPTION OF THE PRESENT INVENTION

Unless defined otherwise in this specification, all technical terms are used herein according to their conventional definitions as they are commonly used and understood by those of ordinary skill in the art. The tradenames are identified for materials used and their sources are also given.

The pigment microcapsules of the present invention are prepared by dispersing an internal phase (or dispersed phase) in a continuous phase (or external phase). The internal phase comprises pigment particles, such as $TiO_2$ particles, dispersed in a mixture of reactive monomers or oligomers and optionally a solvent, whereas the continuous phase comprises a reactive protective colloid of the present invention and a non-solvent for the internal phase. To form the pigment microcapsules having the pigment particles dispersed therein, the internal phase pigment dispersion is emulsified into the continuous phase. A hard shell is formed around the internal dispersion phase as a result of the interfacial polymerization/crosslinking between the reactive monomer or oligomer from the internal phase and the reactive protective colloid from the continuous phase. The resultant pigment microcapsules may be further hardened by solvent evaporation or in-situ polymerization/crosslinking.

I. Novel Reactive Protective Colloids

The reactive protective colloids of the present invention comprise one or more halogenated (e.g., fluorinated) moiety that is soluble in the continuous phase of the dispersion to provide sufficient steric stabilization of the internal phase, and at the same time, bear one or more reactive functional groups that are amenable to interfacial polymerization/crosslinking with appropriate complementary reactants from the internal phase.

The reactive protective colloids of the present invention may be prepared by, for example, linking molecules containing desirable functional groups for interfacial polymerization/crosslinking, with (i) a low molecular weight halogenated compound, polymer or oligomer comprising a halogenated, preferably fluorinated, main chain, or with (ii) a polymer or oligomer comprising a halogenated, preferably fluorinated, side chain. The low molecular weight halogenated compounds include, but are not limited to, halogenated long-chain alkanes, alkenes, arylalkanes and alkylbenzenes.

The reactive protective colloids of the present invention prepared from by path (i) can be represented by Formula (I) below:

$$R\text{-}[Q\text{-}L\text{-}(A)_m]_n \qquad (I)$$

wherein:

m and n are independently natural numbers which are $\geq 1$, preferably from 1 to 10, more preferably from 2 to 6;

Q and L together forming a linking chain for linking the main chain (R) to the reactive functional group(s) A;

A is a reactive functional group; and

R is a low molecular weight group or a polymeric or oligomeric chain, and the halogenated (preferably fluorinated) derivatives thereof. The low molecular weight group may be alkyl, aryl, arylalkyl or alkylaryl.

The reactive functional group A may be amino, hydroxy, thiol, isocyanate, thioisocyanate, epoxide, aziridine, a short-chain alkoxysilyl such as trimethoxy silyl, a carboxylic acid derivative such as acid anhydride or acid chloride, chloroformate or other reactive functional groups capable of undergoing interfacial polymerization/crosslinking.

The alkyl group referred to for R may have 3–40 carbon atoms and the aryl group may have 6–18 carbon atoms.

When R in Formula (I) is a polymeric or oligomeric chain or halogenated derivative thereof, it may be prepared by radical polymerization, condensation polymerization or ring-opening polymerization. Suitable monomers for the preparation of R include, but are not limited to, acrylates, methacrylates, styrene, and their halogenated derivatives; vinyls such as vinylfluoride, vinylidene fluoride, tetrafluoroethylene and chlorotrifluoroethylene; oxiranes or cyclic ethers such as ethylene oxide, propylene oxide, tetrahydrofuran, tetrafluoroethylene oxide, perfluoropropylene oxide and perfluorofurane; and aldehydes such as trifluoroacetaldehyde. R may comprise at least 20 wt %, preferably at least 50 wt %, of fluorine. The average molecular weight (Mw) of R may be in the range of 300 to 100,000, preferably from 500 to 30,000.

In one of the embodiments, the R in Formula (I) may be represented by the Formula (II) below:

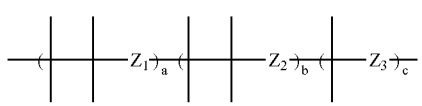

(II)

wherein the open substituent positions (not designated) on the main chain of Formula (II) can be the same or different and may independently be selected from a group consisting of hydrogen, halogen (especially fluoro), alkyl, aryl, alkylaryl, fluoroalkyl, fluoroaryl, fluoroalkylaryl, —$OR^1$, $OCOR^1$, —$COOR^1$, —$CONR^1R^2$ (wherein $R^1$ and $R^2$ are independently hydrogen, alkyl, aryl, alkylaryl, fluoroalkyl, fluoroaryl, fluoroalkylaryl or fluorinated polyether) and substituted derivatives thereof;

$Z_1$, $Z_2$, and $Z_3$ are independently oxygen or absent;

a, b and c are the weight fractions of the corresponding repeating units and are independently in the range of 0–1 with their sum no greater than 1.

The alkyl group referred to in Formula (II) may have 1–20 carbon atoms and the aryl group may have 6–18 carbon atoms.

In the case of Formula (I) wherein n is 1, one of the open substituent positions on the main chain of Formula (II), preferably at one of the two end positions, is substituted with —Q—L—$(A)_m$ and the remaining positions have substituents which may be the same or different, independently selected from the group identified above. In the case of Formula (I) wherein n is greater than 1, more than one of the open substituent positions on the main chain of Formula (II) are substituted with —Q—L—$(A)_m$ and the remaining positions have substituents which may be the same or different, independently selected from the group identified above.

The polymeric or oligomeric chain in Formula (II) may be a homopolymer (i.e., Formula II wherein b and c are 0), a random copolymer (i.e., Formula II wherein the repeating units are arranged randomly), a block copolymer (i.e., Formula II wherein the repeating units are arranged in a particular sequence) or a grafted or comb type of copolymer.

The linking chain, —Q—L—, in Formula (I) is a chain comprising a linking moiety (Q) which is bonded to the low molecular weight, polymeric or oligomeric chain R.

The linking group L connecting to the reactive functional group A is defined in the broadest sense. It is a linking group of 1 to 100 carbon atoms, preferably 2–30 carbon atoms, optionally containing heteroatoms such as oxygen, nitrogen or sulfur. It may be a straight or branched chain and may comprise one or more of the following moieties: saturated or unsaturated hydrocarbon chain optionally interrupted or substituted with one or more heteroatoms, carbocyclic moiety and heterocyclic moiety (wherein said hydrocarbon chain, heteroaliphatic chain, carbocyclic ring or heterocyclic ring is optionally substituted with one or more of non-reactive substituents such as alkyl, oxo, alkylene chain, ethyleneoxide or propyleneoxide chain, ether, thioether, tertiary amine, amide, imide, urea, urethane, sulfone or sulfoamide).

In one of the embodiments of this invention, the linking group, L, may be a straight or branched hydrocarbon chain of 1–20 carbon atoms, preferably 2–10 carbon atoms optionally interrupted or substituted with one or more heteroatoms.

The linking moiety (Q) in the linking chain, —Q—L—, connects to the low molecular weight, polymer or oligomer chain R. In the context of the present invention, the linking moiety may be ether (-O-), thioether (-S-), amide (—$CONR^3$— or —$R^3NCO$—), imide [(—CO)$_2$N—], urea (—$R^3NCONR^4$—), thiourea (—$R^3NCSNR^4$—), urethane (—$OCONR^3$— or —$R^3NCOO$—), thiourethane (—OCSNR$^3$— or —$R^3NCSO$—), ester (—COO— or —OOC—), carbonate (—OC(O)O—), imine (=N—), amine (—$NR^3$—) and the like wherein $R^3$ and $R^4$ are independently hydrogen, alkyl, aryl, alkylaryl, polyether, and their derivatives. The derivatives may be halogenated derivatives such as fluoroalkyl, fluoroaryl, fluoroalkylaryl and fluorinated polyether. $R^3$ or $R^4$ may have 0–100 carbon atoms, preferably 0–20 carbon atoms.

Alternatively, the reactive protective colloids of the present invention may be prepared by using a polymer or oligomer comprising a halogenated (e.g., fluorinated) side chain (the path (ii) discussed above). In this class, the reactive protective colloids of the invention may be represented by the Formula (III) below:

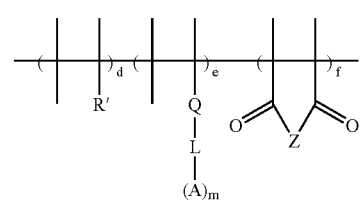

(III)

wherein the open substituent positions (not designated) on the main chain is defined as in Formula (II), and R' is hydrogen, halogen (especially fluoro), alkyl, aryl, alkylaryl, fluoroalkyl, fluoroaryl, fluoroalkylaryl, —$OR^1$, $OCOR^1$, —$COOR^1$, —$CONR^1R^2$ (wherein $R^1$ and $R^2$ are independently hydrogen, alkyl, aryl, alkylaryl, fluoroalkyl, fluoroaryl, fluoroalkylaryl or fluorinated polyether) and substituted derivatives thereof;

Q, L, A and m are defined as in Formula (I);

Z is oxygen, $NR^5$, or N—L—$(A)_m$ in which L, A and m are defined as in Formula (I) and $R^5$ is hydrogen, alkyl, aryl, alkylaryl, fluoroalkyl, fluoroaryl, fluoroalkylaryl, —$COOR^1$, —$CONR^1R^2$ (wherein $R^1$ and $R^2$ are independently hydrogen, alkyl, aryl, alkylaryl, fluoroalkyl, fluoroaryl, fluoroalkylaryl or fluorinated polyether) and substituted derivatives thereof; d, e and f are the weight fractions of the corresponding repeating units with their sum no greater than 1. More specifically, d may be in the range of 0.2–0.995, preferably 0.5–0.95; e may be in the range of 0.005–0.8, preferably 0.01–0.5; and f may be in the range of 0–0.8, preferably 0.001–0.2.

The reactive protective colloids of Formula (III) may have a fluorine content of at least 20 wt %, preferably at least 50 wt %.

The reactive protective colloids of the present invention are soluble or at least readily dispersible in the continuous phase of the microcapsule dispersion, and at the same time, are amenable to interfacial polymerization/crosslinking with the appropriate complementary reactant from the dispersed phase. The solubility of the reactive protective colloids in the dielectric solvent of the electrophoretic suspension may be adjusted by changing chain length of R, the chain length of Q and L or the ratios of a, b and c, or d, e and f. For example, when a perfluoro solvent such as those of the HT and ZT series (from Ausimont, Thorofare, N.J.) is used as the dielectric solvent in the electrophoretic suspension, the fluorine content of the reactive protective colloid must be high enough, preferably greater than 20 wt %, more preferably greater than 50 wt %, to achieve the desired solubility or dispersibility.

When a fluorinated polyether solvent is used as the dielectric solvent, a fluoropolyether functionalized by a reactive group such as an amino or an isocyanate may be the preferred reactive protective colloid. In one embodiment, the colloids may have more than one reactive functional groups. In another embodiment, the reactive protective colloid may have a fluoropolyether chain (R) with at least 2 amino (primary or secondary) or isocyanate (—NCO) groups. The arrangement of the amino and isocyanate functional groups may be that they are concentrated near one end of the linking chain, opposite from the fluorinated R group to maximize the surface activity and the neighboring group effect to speed up the interfacial polymerization/crosslinking reactions. This may reduce undesirable desorption and diffusion of the reactive protective colloid back into the continuous phase after the first amino or isocyanate group reacts at the particle interface with the complementary reactive groups from the internal phase (dispersed phase). Due to their high solubility or dispersibility in the continuous phase, protective colloids having only one reactive functional group for interfacial polymerization/crosslinking tend to desorb from the particles and diffuse back into the continuous phase after reaction at the particle interface with the complementary reactive monomer or oligomer in the internal phase. As a result, microencapsulation using protective colloids having only one reactive functional group may produce capsules with a broad distribution of pigment content inside the capsules and a broad distribution of specific gravity of the capsules.

One embodiment of the present invention is reactive protective colloids having a fluoropolyether chain (R) with a linking chain (—Q—L—) wherein the linking moiety Q is an ether, amide, urea or urethane.

Another embodiment of the invention is reactive protective colloids of Formula (I) wherein R is Formula (II), Q is ether, amide, urea or urethane, L is a straight or branched hydrocarbon chain optionally interrupted by a heteroatom or a straight or branched hydrocarbon chain substituted by an optionally substituted heterocyclic moiety, A is an amino or isocyanate group, m is $\geq 2$ and n is 1.

II. Synthesis of the Reactive Protective Colloids

The reactive protective colloids may be prepared by a variety of methods or a combination thereof. The halogenated (e.g., fluorinated) polymeric or oligomeric chain (R in Formula I) may be a homopolymer, a random copolymer, a block copolymer or a grafted or comb type of copolymer, and it may be prepared by well-known radical, condensation, ring-opening or ionic polymerization mechanism using appropriate substituted or unsubstituted monomers, catalyst and initiators. Suitable substituted or unsubstituted monomers include vinyls, acrylates, styrenes, dienes, maleic anhydride, oxiranes, epoxides, cyclic ethers, aldehydes, acetals, lactones and their fluorinated derivatives. Alternatively, the polymeric or oligomeric chain may be prepared by modifying the side chains of preformed polymers. All of these methods may be activated thermally or by actinic radiation.

After the polymeric or oligomeric chain is formed, the reactive protective colloids of the present invention may be prepared according to the following reaction schemes:

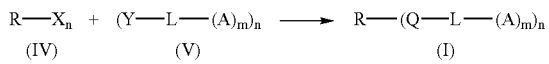

In these reaction schemes, R, Q, L, A, m and n are as defined above, and X is a reactive group capable of reacting with a complementary reactive group Y to form a linking moiety Q. For example, X and Y may be independently —OH, —SH, I—, Br—, Cl—, —NH$_2$, =NH, carboxyl or derivatives (e.g., —COOH, —COOR or —COCl), acrylate, anhydride, isocyanate (—NCO), isothiocyanate (—NCS), amide (—CONH$_2$) or urea, provided that X and Y are complementary to each other to form a linking moiety.

The compound of Formula (V) having functional group(s), A, may be synthesized by conventional methods based on the desired structure of the compound of Formula (I), or in most cases they may be obtained from commercial sources.

In preparing the compound of Formula (I), the linking moieties are formed from a reaction between the X and Y groups. For example, an amide linking moiety may be formed by reacting a compound of Formula (IV) wherein X is an ester group with a compound of Formula (V) wherein Y is an amino group. The formation of the perfluoroamide moiety may be carried out under mild reaction conditions in a fluorinated solvent or solvent mixture at room temperature. Suitable solvents for synthesizing fluorinated protective colloids for this invention include 1,1,2-trichlorotrifluoroethane, α,α,α-trifluorotoluene, perfluoroalkanes or perfluorocycloalkanes such as perfluorodecalin, PF-5060DL from 3M Company (St. Paul, Minn.), perfluoroarylalkanes (e.g., perfluorotoluene or perfluoroxylene), perfluoro-tert-amines, such as FC-43, FC-70 from 3M company (St. Paul, Minn.), poly(chlorotrifluoroethylene) such as Halocarbon Oils from Halocarbon Product Corp. (River Edge, N.J.), Daifloil oil or CTFE oil from Daikin Industries, methyl perfluorobutyl ether, ethyl perfluorobutyl ether, perfluoroethers such as perfluorotetrahydrofuran derivatives FC-75, FC-77 from 3M company, low molecular weight perfluoropolyethers such as Krytox® K-fluids K-6 and K-7 from Dupont, Demnum lubricating oils from Daikin Industries(Orangeburg, N.Y.), Galden/Fomblin fluid HT-170, HT-200, HT-230 from Ausimont, poly(perfluoropropylene oxide) from TCI America (Portland, Oreg.), hydrofluoropolyethers such as ZT series from Ausimont and the like. 1,1,2-Trichlorotrifluoroethane, α,α,α-trifluorotoluene or a mixture thereof may be particularly preferred. To increase the reaction yield, an excess of the compound of Formula (V) may be used. The reaction is demonstrated in Example 1A.

An urethane linking moiety may be formed by reacting a compound of Formula (IV) wherein X is a primary alcohol (—CH$_2$OH) with a compound of Formula (V) wherein Y is an isocyanate group, with or without a catalyst. An excess of the compound of Formula (V) may also be used in this case and the reaction is carried out in a refluxed fluorinated solvent, such as 1,1,2-trichlorotrifluoroethane and α,α,α-trifluorotoluene or a mixture thereof. The reaction is demonstrated in Example 1B. Similarly, the linking moiety of (—SCON=) is formed by reacting a compound of Formula (IV) wherein X is a thiol group with a compound of Formula (V) wherein Y is an isocyanate group.

Other linking moieties may also be formed by conventional methods. The ether or thioether linking moiety, for example, may be formed by reaction between an alcohol or thiol group with halogen. The imide linking moiety may be formed, for example, by reacting a succinic acid diester or an o-phthalic acid diester with a primary amine. The urea or thiourea group may be formed by reaction between an isocyanate or isothiocyanate with a primary or secondary amine. The amine linking group, for example, may be formed by reaction between amine and a halide or a tosylated alcohol. The ester linking groups may be formed by reaction between a carboxyl group and an alcohol group. The above list clearly is not exhaustive. Other useful synthetic schemes are readily available in general organic chemistry textbooks. The reaction conditions for forming these linking moieties are also well known in the art. Detailed discussions are omitted here for the interest of brevity.

The sequence of the synthesis of the polymeric or oligomeric chain (R) can vary and may involve, for example, polymerization followed by chain modification or modification of a preexisting chain to add or modify the functional groups or a combination thereof.

The reactive protective colloids of Formula (III) may be prepared by, for example, random copolymerization of fluorinated monomers such as perfluoroacrylates, tetrafluoroethylene or vinylidene fluoride with functional monomers such as isocyanatoethyl acrylate, isocyanatostyrene, hydroxyethyl methacrylate, glycidyl acrylate or maleic anhydride, followed by derivatization with multifunctional amines, thiols, alcohols, acids, isocyanates or epoxides.

III. Preparation of the Pigment Microcapsules using Reactive Protective Colloids of the Present Invention The pigment microcapsules can be prepared by interfacial polymerization/crosslinking or in-situ polymerization during or after the internal phase is well emulsified or dispersed into the continuous phase. The combination of the interfacial reaction and the in-situ polymerization is useful for the preparation of highly crosslinked microcapsules.

The internal phase (or the dispersed phase) is prepared by dispersing pigment particles, such as $TiO_2$ particles, into a mixture of reactive monomers or oligomers, and optionally a fugitive solvent by conventional dispersing or milling mechanisms such as homogenizer, sonicator, colloidal mill, high shear mixer and the like. The reactive monomers or oligomers suitable for the present invention include multifunctional isocyanates, thioisocyanates, epoxides, acid chlorides, chloroformates, alkoxysilanes, amines, thiols, alcohols and their precondensates, and vinyl monomers such as acrylates, methacrylates and styrene. Polyisocyanates and polyols can be added in the amount of 5–300 wt %, preferably 50–150 wt %, more preferably 80–120 wt % based on the pigment used in the internal phase.

The continuous phase (or the external phase) may comprise a reactive protective colloid of the present invention and a solvent which is incompatible with the internal phase. Examples of suitable solvents for the continuous phase include, but are not limited to, perfluoro solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as those from Galden/Fomblin and perfluoropolyethers HT series, particularly HT-170, HT-200, and HT-230, and hydrofluoropolyethers ZT series from Ausimont, FC-43 (heptacosafluorotributylamine), FC-70 (perfluorotri-n-petylamine), PF-5060 or PF-5060DL (perfluorohexane), and FC-75 or FC-77 (perfluorotetrahydrofuran derivatives) from 3M Company (St. Paul, Minn.), low molecular weight polymers such as poly(perfluoropropylene oxide) from TCI America (Portland, Oreg.), poly(chlorotrifluoroethylene) such as Halocarbon Oils from Halocarbon Product Corp. (River Edge, N.J.), Krytox® K-fluids (trifluoro(trifluoromethyl)oxirane, homopolymers) from Dupont and Demnum lubricating oils from Daikin Industries. Perfluoropolyethers and hydrofluoropolyethers such as Ausimont HT-170, HT-200, HT-230, ZT180 and Dupont K-6 and K-7 fluids are useful.

To form the microcapsules having the pigment particles dispersed therein, an internal phase comprising the pigment dispersion is emulsified into the continuous phase. A hard shell is then formed around the internal phase particles as a result of the interfacial polymerization/crosslinking between the reactive monomers or oligomers from the internal phase and the reactive protective colloid from the continuous phase.

The complementary reactive group of the reactive monomer or oligomer in the dispersed phase is determined by the choice of the functional group in the reactive protective colloid in continuous phase and vice-versa. Examples of pairs of reactive groups may include amine/isocyanate, amine/thioisocyanate, amine/acid chloride or anhydride, amine/chloroformate, amine/epoxide, alcohol/isocyanate, alcohol/thioisocyanate, thiol/isocyanate, thiol/thioisocyanate, carbodiimide/epoxide and alcohol/siloxane.

In addition to the reactive protective colloids, a second co-reactant for the interfacial polymerization/crosslinking, such as a low molecular weight polyfunctional amine and polyisocyanate may also be optionally added to the continuous phase to increase the thickness and crosslinking density of the shell. It is not required that the second co-reactant be surface active or soluble in the continuous phase. The second co-reactant may be dispersed or solubilized in the continuous phase in the presence of the reactive protective colloid. The second co-reactant may not react with the protective colloid. Suitable low molecular weight polyfunctional amines include tris-(2-aminoethyl)amine, ethylene diamine, diethylenetriamine, triethylenetetraamine, polyisocyanates such as Desmodure® N-3300, N-3400 from Bayer and the like and it can be added in an amount ranging from 0 to 10% by weight based on the internal phase, preferably 2–5%. The internal phase core wherein the pigment particles are dispersed may be further hardened by solvent evaporation, in-situ addition polymerization/crosslinking or in-situ condensation polymerization/crosslinking reactions during or after the shell is formed.

The resulting microcapsules have pigment particles well dispersed inside the microcapsules. The size of the microcapsules can range from 0.1–10µ, preferably 0.4–3µ, more preferably 0.5–1.2µ. The size of the pigment primary particles may be submicrons, preferably from 0.01–0.5 microns, more preferably 0.1–0.4 microns. The specific gravity of the resultant pigment microcapsules can range from 1.4–2.0, preferably 1.5–2.5, more preferably 1.6–1.8 and the specific gravity may be fine tuned by controlling the type and concentration of the reactive protective colloid in the continuous phase and interphase, the type and concentration of pigment and the type and concentration of the monomer/oligomers used in the internal phase.

The present invention has many advantages. First of all, the reactive colloids of the present invention are not bonded onto the pigment directly. Instead, the pigments are encapsulated or coated with a polymeric material to match the density to that of the dielectric solvent, and the reactive protective colloid is chemically bonded to the surface of the microcapsules to stabilize the microcapsules and improve the switching performance. No functional group on the pigment surface is required. Consequently, the reactive protective colloids and the microencapsulation processes of this invention are useful for all types of pigments (organic, inorganic, acidic, basic and neutral pigments including those without a chemically reactive group).

A wide range of pigment concentration in the microcapsule can be easily prepared by the processes of this invention. As a result, the microcapsules of this invention can be easily density matched to a variety of dielectric solvents and maintain a high hiding power or efficiency of light scattering. In addition, since all of the reactive protective colloid molecules are covalently bonded to the surface of the microcapsules, no desorption of the protective colloid into the continuous phase may occur. Low viscosity, stable microcapsule dispersions can be prepared with minimum amount of protective colloid. As a result, the shelf life, contrast ratio and switching speed of the EPD using pigment microcapsules prepared by the microencapsulation process using the reactive colloids of this invention are improved significantly. In addition, because of the absence of free protective colloid in the continuous phase, no deposition of the protective colloid onto the electrodes may occur even after prolonged switching cycles in a strong electric field. The EPD displays of this invention have shown significantly improved performance and reliability during continuous long-term operation.

Furthermore, the present invention allows further improvement of the display performance by purifying the microcapsules without causing instability of the microcapsules. Purification of microcapsules may be achieved by centrifuge, field flow fractionation, extraction or dialysis to separate unreacted or free protective colloid from the dispersion.

Unless the protective colloid is chemically bonded to the microcapsules, there generally exists an equilibrium adsorption isotherm between non-reacted adsorbed protective colloids on the particle surface and the free protective colloids in the continuous phase. In prior art applications using adsorbed colloids, the process of separating the free protective colloids from the continuous phase would shift this equilibrium which inevitably results in desorption of the protective colloid and leads to deterioration of the dispersion and a shortened shelf life of the display.

The pigment microcapsules or microparticles of the present invention may be used in any types of electrophoretic display known in the art, including the conventional types of electrophoretic displays. The display may also be prepared from the novel microcup technology involving microembossing or photolithography. In this case, the display cells are of well-defined size, shape and aspect ratio, and are individually sealed, preferably with a polymeric sealing layer. The display cells may be prepared by the microencapsulation technology (U.S. Pat. No. 5,961,804 and No. 5,930,026). In this type of the displays, the size of the display cells may range from 5–500 microns, preferably from 25 to 250 microns. The shell of the microcapsule cells may be formed by chemical encapsulation processes such as interfacial polymerization/crosslinking, in-situ polymerization/crosslinking, complex coacervation and physical encapsulation processes such as simple coacervation, solvent evaporation and the like. The pigment microcapsule dispersion of the present invention is the core or the internal phase of this microcapsule-in-microcapsule system. In this case, the continuous phase of the second microencapsulation process should be incompatible with the solvent used as the continuous phase in the first microencapsulation process. The size of the microcapsule-in-microcapsule is about the same as the size of display cell and may be in the range of 5–500 microns, preferably 25–250 microns.

The display may have the traditional up/down switching mode, the in-plane switching mode or the dual switching mode.

In the display having the traditional up/down switching mode or the dual switching mode, the individually sealed cells are enclosed between two electrode plates, at least one of which is transparent. The up/down mode allows the microencapsulated pigment particles to move in the vertical (up/down) direction whereas the dual switching mode allows the microencapsulated pigment particles to move in either the vertical (up/down) direction or the planar (left/right) direction. In the display having the in-plane switching mode, the cells are sandwiched between an insulator layer and an electrode plate. The in-plane switching mode allows the microencapsulated pigment particles to move in the planar direction only.

EXAMPLES

The following examples are given to enable those skilled in the art to more clearly understand and to practice the present invention. They should not be considered as limiting the scope of the invention, but merely as being illustrative and representative thereof.

Example 1A

Synthesis of a Functionalized Halogenated Polymers for Microencapsulation

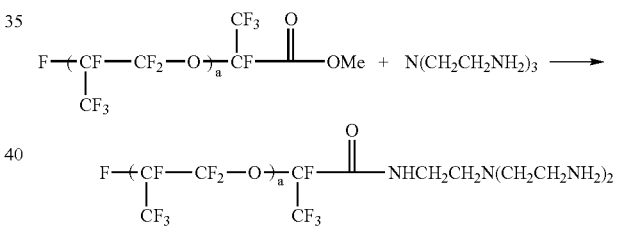

17.8 g of Krytox® methyl ester (MW=~1780, a (weight fraction)=about 0.933 with 10 repeating units, from DuPont) was dissolved in a solvent mixture containing 12 g of 1,1,2-trichlorotrifluoroethane (Aldrich) and 1.5 g of α,α,α-trifluorotoluene (Aldrich). The resultant solution was added drop by drop into a solution containing 7.3 g of tris(2-aminoethyl)amine (MW-146, from Aldrich) in 25 g of α,α,α-trifluorotoluene and 30 g of 1,1,2-trichlorotrifluoroethene over 2 hours with stirring at room temperature. The mixture was then stirred for another 8 hours to allow the reaction to complete. The IR spectrum of the product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4–6 hours (1 Torr). The crude product was then dissolved in 50 ml of PFS2 solvent (low molecular weight. perfluoropolyether from Ausimont) and extracted three times with 20 ml of ethyl acetate; then dried to yield 17 g of purified product (Rf-amine1900) which showed excellent solubility in HT200.

Other multifunctional Rf-amines of Formula (I) having different molecular weights such as Rf-amine4900 (a=0.977 with 30 repeating units), Rf-amine2000 (a=0.939 with 11 repeating units), Rf-amine800 (a=0.848 with 4 repeating units) and Rf-amine650 (a=0.807 with 3 repeating units) were also synthesized according to the same procedure. Rf-amine350 was also prepared by the same procedure, except that the Krytox® methyl ester was replaced by $CF_3CF_2CF_2COOCH_3$ (from SynQuest Labs, Alachua Fla.).

Example 1B

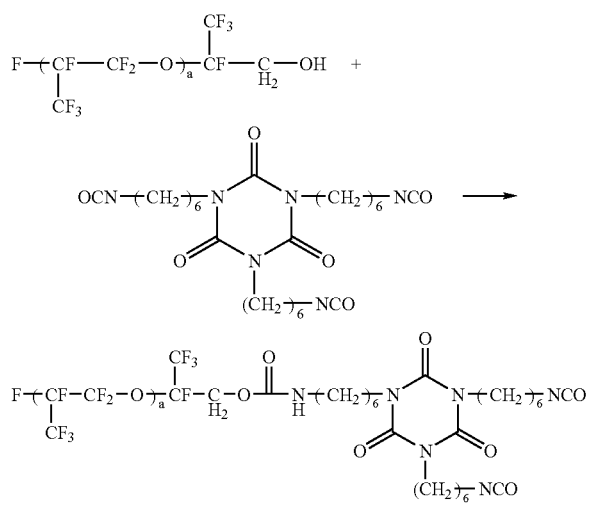

12 g of Krytox® alcohol (MW=1200, from DuPont) was dissolved in 50 g of 1,1,2-trichlorotrifluoroethane. The resulting solution was added dropwise, over four hours period, to a refluxing solution containing 5.85 g Desmodur® N3400 (EW=195, from Bayer), 30 g of 1,1,2-trichlorotrifluoroethane and 5 g of α,α,α-trifluorotoluene under stirring. Refluxing was continued for another 10 hours to complete the reaction. Solvent was stripped to obtained a viscous liquid. Infrared spectrum showed emerging band at 1730 $cm^{-1}$ characteristic of the urethane group in the product.

A series of fluorinated multifunctional isocyanates were synthesized by the same reaction procedure from various fluoro alcohols, including 1H,1H,11H-perfluoro-1-undecanol (Aldrich), Zonyl FSO and FSN (DuPont) and 2,2,3,3,4,4,5,5-octafluoro-1-pentanol (Aldrich).

Examples 2A and 2B

Microencapsulation by Interfacial Polymerization 3.82 g of Desmodur® N3400 aliphatic polyisocyanate (from Bayer AG) and 1.87 g of Multranol® 9175 (Bayer AG) were dissolved in 4.2 g of MEK (methyl ethyl ketone). To the resultant solution, 6.94 g of $TiO_2$ R900 (DuPont) was added and homogenized for 1 minute at room temperature; 0.013 g of dibutyltin dilaurate (Aldrich) was added and homogenized for 2 more minutes; and finally 26.70 g of a HT-200 solution containing 0.67 g of Rf-amine4900 (from Example 1) was added and homogenized for an additional minute. The MEK was then removed by vacuum at room temperature.

The slurry prepared above was emulsified slowly at room temperature by a homogenizer into 30 g of a HT-200 solution containing 0.66 g of Rf-amine1900 (from Example 1), 1.3 g of Krytox® 157 FSL, 0.15 g of tris(2-aminoethyl) amine (Aldrich) and 0.40 g of 4-(aminomethyl)pyridine (Aldrich). The resulting microcapsule dispersion was heated at 80° C. for 2 hours with stirring to post cure the particles.

Two EPD fluids containing 1 wt % of perfluorinated Cu phthalocyanine dye FC-3275 (from 3M) and 8 wt % solid of the $TiO_2$ microcapsules in HT200 (Example 2A) and in a 4:1 (w/w) mixture of HT200 and ZT180 (Example 2B) were prepared. Their switching performances in an EPD cell between two ITO glass plates (Part No. CG-401 N-S215, Delta Technologies, Limited, Stillwater, Minn.) using 35 micron PET films (DuPont, Hopewell, Va.) as the spacers are given in Table 1.

Example 3

Microencapsulation by Interfacial Polymerization

The procedure of Example 2 was repeated, except that the 4-(aminomethyl)pyridine was replaced with 1-(2-aminoethyl)piperazine (Aldrich). The EPD fluid was prepared in HT-200 as in Example 2A and the switching performances are also shown in Table 1.

Example 4

Microencapsulation by Interfacial Polymerization

The procedure of Example 3 was repeated, except that the 1-(2-aminoethyl)piperazine was replaced by 1-(3-aminopropyl)imidazole (Aldrich). Results are shown in Table 1.

Example 5 (Comparative Example)

3.4 g of 5% AOT (dioctyl sulfosuccinate, sodium salt, from Aldrich) solution in MEK were added to 50 g of the microcapsule dispersion as prepared in Example 3. The dispersion was heated at 80–85° C. for 1 hour and the residual MEK was removed under vacuum. The EPD fluid was prepared in HT-200 as in Example 2A and the switching performances are also shown in Table 1.

Example 6

Microencapsulation by Interfacial Polymerization 4.54 g of Desmodur® N3400 (aliphatic polyisocyanate from BayerAG) and 0.77 g of 1-[N,N-bis(2-hydroxyethyl) amino]2-propanol (Aldrich) were dissolved in 3.74 g of MEK. To the resulting solution, 5.90 g of $TiO_2$ R900 (DuPont) was added and homogenized for 2 minutes at 5–10° C.; 0.013 g of dibutyltin dilaurate (Aldrich) was added and homogenized for another 30 seconds at 5–10° C.; and finally 20 g of a HT-200 solution containing 0.47 g of Rf-amine4900 (from Example 1) was added and homogenized for an addition minute.

The slurry prepared above was emulsified slowly at room temperature by a homogenizer into 36 g of a HT-200 solution containing 0.09 g of Rf-amine 2000 (From Example 1), 1.4 g of Krytox® 157 FSL, 0.43 g of tris(2-aminoethyl) amine and 0.15 g of 4-(aminomethyl)pyridine. The resulting microcapsule dispersion was heated at 80° C. for 3 hours under mechanical stirring to remove MEK and post cure the microcapsules.

The EPD fluid was prepared and evaluated as in Example 2B. The results are also shown in Table 1.

Example 7

Microencapsulation by Interfacial Polymerization 4.54 g of Desmodur® N3400 (aliphatic polyisocyanate from BayerAG) and 0.77 g of 1-[N,N-bis(2-hydroxyethyl) amino]2-propanol (Aldrich) were dissolved in 3.74 g of MEK. To the resulting solution, 5.90 g of $TiO_2$ R900 (DuPont) was added and homogenized for 2 minutes at 5–10° C.; 0.013 g of dibutyltin dilaurate (Aldrich) was added and homogenized for another 30 seconds at 5–10° C.; and finally 20 g of a HT-200 solution containing 0.47 g of Rf-amine4900 (from Example 1) was added and homogenized for an additional minute.

The slurry prepared above was emulsified slowly at room temperature by a homogenizer into 36 g of HT-200 containing 0.92g of Rf-amine350 (from Example 1), 0.5 g of Krytox® FS 1366 and 0.48 g of 1-(2-aminoethyl)piperazine. The resulting microcapsule dispersion was heated at 80° C. for 3 hours under mechanical stirring to remove MEK and post cure the microcapsules. The EPD fluid was prepared and evaluated as in Example 6. The results are also shown in Table 1.

Example 8

Microencapsulation by Interfacial Polymerization 4.54 g of Desmodur®N3400 and 0.77 g of 1-[N,N-bis(2-hydroxyethyl)amino]2-propanol (Aldrich) were dissolved in 3.74 g of MEK. To the resulting solution, 5.90 g of $TiO_2$ R900 (DuPont) was added and homogenized for 2 minutes at 5–10° C. after which a solution containing 0.013 g of dibutyltin dilaurate (Aldrich) and 0.2 g of 5% $Zr(acac)_4$ (from Aldrich, acac=acetylacetonate) solution in ethyl acetate was added. The slurry was homogenized for another 30 seconds at 5–10° C. and then 20 g of a HT-200 solution containing 0.47 g of Rf-amine4900 (from Example 1) was added and homogenized for an additional minute.

The slurry prepared above was emulsified slowly at room temperature by a homogenizer into 36 g of HT-200 containing 0.92 g of Rf-amine350 (from Example 1), 0.5 g of Krytox® FS 1366 and 0.48 g of 1-(2-aminoethyl)piperazine. The resulting microcapsule dispersion was heated at 80° C. for 3 hours under mechanical stirring to remove MEK and post cure the microcapsules. The EPD fluid was prepared and evaluated as in Example 6. The results are also shown in Table 1.

Example 9

Microencapsulation by Interfacial Polymerization

The procedure of Example 8 was repeated except that the 36 g of HT-200 solution also contains 0.30 g of zirconium (hexafluoroacetoacetate) $[Zr(HFA)_4]$ (from Gelest).

Example 10 (Comparative Example)

The procedure of Example 8 was repeated except that the 0.2 g of $(Zr(acac)_4$ was replaced by 0.15 g of 5% AOT solution in MEK.

TABLE 1

EPD Performance (Examples 2–10)

| Example | Mean Size (μm) | Contrast Ratio | Ton @ 30 V (msec) | Toff @ 30 V (msec) | Solvent |
|---|---|---|---|---|---|
| 2A | 1.6 ± 0.7 | 35 | 330 | 280 | HT200 |
| 2B | | | 120 | 110 | HT200/ZT180 = 4/1 |
| 3 | 1.5 ± 0.8 | 10 | 100 | 100 | HT200 |
| 4 | 1.8 ± 0.9 | 20 | 350 | 300 | HT200 |
| 5 | 1.5 ± 0.8 | 10 | 250 | 300 | HT-200 |
| 6 | 1.5 ± 0.8 | 30 | 70 | 70 | HT200/ZT180 = 4/1 |
| 7 | 1.5 ± 0.8 | 15 | 90 | 120 | HT200/ZT180 = 4/1 |
| 8 | 1.7 ± 0.8 | 15 | 175 | 288 | HT200/ZT180 = 4/1 |
| 9 | 1.7 ± 0.8 | 11 | 250 | 330 | HT200/ZT180 = 4/1 |
| 10 | 1.7 ± 0.8 | 14 | 350 | 400 | HT200/ZT180 = 4/1 |

Example 11

Microencapsulation by Interfacial Polymerization Followed by In-Situ Radical Polymerization 68.81 Parts (w/w) of Ti-Pure® R706 ($TiO_2$ from DuPont) were dispersed in a solution comprising 22.12 parts of isobornylmethacrylate, 7.37 parts of dodecylmethacrylate (both from Aldrich) and 1.7 parts of Disperbyk® 142 (from BYK Chemie) using sonication (Fisher Model 550) with a ½ inch diameter flat tip for 15 minutes by applying an on/off pulsed mode at 25° C. To 7.55 parts of the above $TiO_2$ slurry in a vial, 0.03 parts of radical initiator AIBN (VAZO64, DuPont), 0.96 parts of Desmodur® N3400 (Bayer), 0.28 parts of SR399 (multifunctional acrylate, Sartomer), 0.28 parts of HDODA (diacrylate, from UCB) and 0.1 part of 4-vinylpyridine (Aldrich) were added. The resultant $TiO_2$ dispersion was added drop-wise and emulsified into a solution composed of 0.64 parts of Krytox® 157FSL (DuPont) and 60 parts of Galden HT200 (Ausimont) at 35° C. using a homogenizer (PowerGen®) 700) at 7500 rpm. After 1 minute, a solution containing 30 parts of HT200 and 0.15 parts of Rf-amine1900 (from Example 1) was added at once into the flask. After 1 hour, the flask was purged with argon for 20 minutes and the microcapsule slurry was kept at 70° C. for 8 hours under argon with stirring at 7500 rpm. The evaluation of Example 11 was performed as in Example 3 and the results are given in Table 2.

Example 12 (Comparative Example)

The procedure of Example 11 was repeated, except that Rf-amine1900 was replaced by 1,10-diamino-3,3,4,4,5,5,6,6,7,7,8,8-dodecafluoro-decane (DADFD) (Fluorochem, Inc., Asuza, Calif.). The particles as observed by SEM were similar in size and shape to the particles formed in Example 11. The dispersion, evaluated as in Example 11, stopped switching in less than one minute due to the formation of an irreversible cluster at the glass electrode.

Example 13

Microencapsulation by Interfacial Polymerization Followed by In-Situ Radical Polymerization 64.76 Parts (w/w) Ti-Pure® R706 (DuPont) particles were dispersed as in Example 11 in a solution containing 23.85 parts of isobornylmethacrylate (Aldrich), 2.16 parts of Sartomer SR399 (Sartomer), 2.92 parts of HDODA (UCB), 4.71 parts of 4-vinylpyridine (Aldrich) and 1.6 parts of Disperbyk 142 (BYK Chemie). To 20.59 parts of the above TiO$_2$ slurry in a vial, 0.35 parts of AIBN (VAZO64, DuPont), 5.47 parts of Desmodur® N3400 (Bayer) and 1.66 parts of Krytox® 157FSL (DuPont) were added. The resultant TiO$_2$ dispersion was added drop-wise and emulsified into a solution containing 0.66 parts of Rf-amine1900 and 64 parts of Galden HT-200 (Ausimont) at 35° C. under high shear mixing using a PowerGen® 700 spinning at 25,000 rpm. After 1 minute, a solution containing 7 parts of Galden HT200 and 0.28 parts of tris(2-aminoethyl)amine was added to the dispersion. After four additional minutes, the dispersion was transferred from the reactor to an uncapped vial, purged with argon for 20 minutes and then capped and shaken at 70° C. for 8 hours. The evaluation of Example 13 was performed as in Example 11 and the results are given in Table 2.

TABLE 2

EPD Performance (Examples 11–13)

| Example | Mean Size | Contrast Ratio | Ton @ 30 V (msec) | Toff @ 30 V (msec) |
|---|---|---|---|---|
| 11 | 2.1 ± 1.7 | 11 | 500 | 275 |
| 12 | 2.0 ± 1.0 | N/A | N/A | N/A |
| 13 | 2.8 ± 1.2 | 12 | 325 | 140 |

Example 14

Microencapsulation by Interfacial Polymerization 18.2 g TiO2 R900 (DuPont) was added to a solution consisting of 10.9 g of MEK, 12.6 g of Desmodure® N3400 aliphatic polyisocyanate (BayerAG) and 2.0 g of 1-[N,N-bis(2-hydroxyethyl)amino]-2-propanol (Aldrich). The resulting slurry was homogenized for 1 minute at 5–10° C. and 0.02 g of dibutyltin dilaurate (Aldrich) were added. Homogenization was continued for an additional minute at 5–10° C. and a solution containing 55 g of HT-200 and 1.4 g of Rf-amine4900 (from Example 1) was added and homogenized for additional 3 minutes at room temperature.

The slurry prepared above was emulsified slowly at room temperature by a homogenizer into 95 g of a HT-200 solution containing 1.8 g of Rf-amine2000 (from Example 1) and 3.24 g of Rf-amine350 (from Example 1). The resulting microcapsule dispersion was kept stirring under low shear by a mechanical stirrer for 30 minutes at 35° C. and then at 80° C. for 3 hours to remove MEK and post cure the microcapsules. The microcapsule dispersion shows a narrow particle size distribution ranging from 0.5–3.5 microns.

The microcapsules were separated by centrifugal and redispersed in HT-200. The EPD fluid was prepared and evaluated as in Example 3 except that the ITO glass plates were precoated with a 5 microns polystyrene layer. A contrast ratio of about 20 at 85V with $T_{tot}$=10 msec was observed, wherein $T_{tot}$ is the sum of $T_{on}$ (time on) and $T_{off}$ (time off). The performance was satisfactory even after prolonged switching cycles.

Example 15

Microencapsulation by Interfacial Polymerization 5.9 g of TiO2 R900 (DuPont) was added to a solution consisting of 3.77 g of MEK, 4.54 g of N3400 aliphatic polyisocyanate (BayerAG), and 0.77 g of 1[N,N-bis(2-hydroxyethyl)amino]-2-propanol (Aldrich). The resulting slurry was homogenized for 1 minute at 5–10° C.; 0.01 g of dibutyltin dilaurate (Aldrich) was added and homogenized for an additional minute at 5–10° C.; and finally a solution containing 20 g of HT-200 and 0.47 g of Rf-amine4900 (from Example 1) was added and homogenized again for 3 minutes at room temperature.

The slurry prepared above was emulsified slowly at room temperature by a homogenizer into a mixture containing 31 g of HT-200 and 2.28 g of Rf-amine650 (from Example 1). The resulting microcapsule dispersion was kept stirring under low shear by a mechanical stirrer at 35° C. for 30 minutes and at 80° C. for 3 hours to remove MEK and post cure the microcapsules. The microcapsule dispersion shows a narrow particle size distribution ranging from 0.5–3.5 microns.

The microcapsules were separated by centrifugal and redispersed in HT-200. The EPD fluid was prepared and evaluated as in Example 3 except that the ITO glass plates were precoated with a 5 microns polystyrene layer. A contrast ratio of about 20 at 85V with $T_{tot}$=10 msec was observed, wherein $T_{tot}$ is the sum of $T_{on}$ (time on) and $T_{off}$ (time off). The performance was satisfactory even after prolonged switching cycles.

It can be seen from the above examples that the novel electrophoretic dispersion has resulted in significant improvements in switching rate, response time (rising time and falling time) and contrast ratio of the display. The undesirable particle deposition onto the electrodes are significantly reduced. The novel electrophoretic displays prepared by using the microcapsule dispersions of this invention showed a significantly better shelf life stability and performance consistency even after prolonged switching.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. A reactive protective colloid of Formula (I):

R-[Q-L-(A)$_m$]$_n$     (I)

wherein:
   m and n are independently natural numbers which are ≧1;
   Q and L together is a linking chain;
   A is a reactive functional group; and
   R is a low molecular weight group, a polymeric or oligomeric chain or a halogenated derivative thereof.

2. The reactive protective colloid of claim 1 wherein m and n are independently 1 to 10.

3. The reactive protective colloid of claim 2 wherein m and n are independently 2 to 6.

4. The reactive protective colloid of claim 1 wherein the linking moiety Q is ether, thioether, amide, imide, urea, thiourea, urethane, thiourethane ester, carbonate, imine, amine, or a derivative thereof.

5. The reactive protective colloid of claim 4 wherein said linking moiety is amide.

6. The reactive protective colloid of claim 4 wherein said linking moiety is urethane.

7. The reactive protective colloid of claim 1 wherein R is represented by the following formula:

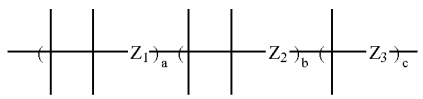
(II)

wherein, the open and not designated substituent positions on the main chain are independently selected from the group consisting of hydrogen, halogen, alkyl, aryl, alkylaryl, fluoroalkyl, fluoroaryl, fluoroalkylaryl, —COOR$^1$, —CONR$^1$R$^2$, and substituted derivatives thereof, wherein R$^1$ and R$^2$ are independently hydrogen, alkyl, aryl, alkylaryl, fluoroalkyl, fluoroaryl, fluoroalkylaryl or fluorinated polyether;

$Z_1$, $Z_2$, and $Z_3$ are independently oxygen or absent; and a, b and c are the weight fractions of the corresponding repeating units and are independently in the range of 0–1 with their sum no greater than 1.

8. The reactive protective colloid of claim 7 wherein halogen is fluorine.

9. The reactive protective colloid of claim 1 wherein R is a homopolymer, a random copolymer, a block copolymer or a grafted or comb type of copolymer.

10. The reactive protective colloid of claim 1 which has an average molecular weight in the range of 350 to 100,000.

11. The reactive protective colloid of claim 1 which has an average molecular weight in the range of 500 to 30,000.

12. The reactive protective colloid of claim 1 wherein R comprises at least 20 wt % of fluorine.

13. The reactive protective colloid of claim 1 wherein R comprises at least 50 wt % of fluorine.

14. The reactive protective colloid of claim 1 wherein A is an amino or an isocyanate group.

15. The reactive protective colloid of claim 14 wherein m is $\geq 2$.

16. The reactive protective colloid of claim 15 wherein m is 2.

17. The reactive protective colloid of claim 1 wherein R is Formula (II) in which the main chain is substituted with one or more fluorine atoms or trifluoromethyl groups, $Z_1$ is oxygen, $Z_3$ is absent, a is 0.8–0.995, b is 0, and c is 0.005–0.2.

18. The reactive protective colloid of claim 17 wherein A is —NH$_2$ group, m is 2 and —Q—L is a linking chain with an amide linking moiety.

19. The reactive protective colloid of claim 1 wherein R is Formula (II) in which the main chain is substituted with one or more fluorine atoms or trifluoromethyl groups, $Z_1$ is oxygen, $Z_2$ is absent and c is 0, a is 0.8 to 0.995 and b is 0.005 to 0.2.

20. The reactive protective colloid of claim 19 wherein A is isocyanate group, m is 2 and —Q—L— is a linking chain with an urethane or urea linking moiety.

21. A reactive protective colloid of Formula (III)

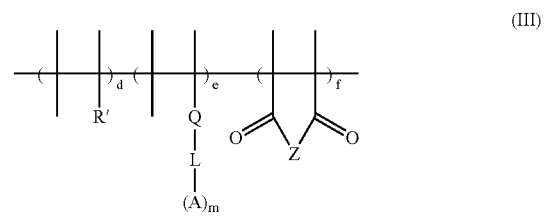
(III)

wherein the open and not designated substituent positions on the main chain are independently selected from the group consisting of hydrogen, halogen, alkyl, aryl, alkylaryl, fluoroalkyl, fluoroaryl, fluoroalkylaryl, —COOR$^1$, —CONR$^1$R$^2$, and substituted derivatives thereof, wherein R$^1$ and R$^2$ are independently hydrogen, alkyl, aryl, alkylaryl, fluoroalkyl, fluoroaryl, fluoroalkylaryl or fluorinated polyether;

R' is hydrogen, halogen, alkyl, aryl, alkylaryl, fluoroalkyl, fluoroaryl, fluoroalkylaryl, —OR$^1$, OCOR$^1$, —COOR$^1$, —CONR$^1$R$^2$, or a substituted derivative thereof, —Q—L— is a linking chain;

A is a reactive functional group;

m is $\geq 1$.

Z is oxygen, NR$^5$, or N—L-(A)$_m$, wherein L is a linking group,

R$^5$ is hydrogen, alkyl, aryl, alkylaryl, fluoroalkyl, fluoroaryl, fluoroalkylaryl, —COOR$^1$, —CONR$^1$R$^2$ or a substituted derivative thereof; and d, e and f are the weight fractions of the corresponding repeating units with their sum no greater than 1.

22. The reactive protective colloid of claim 21 wherein d is in the range of 0.2–0.995.

23. The reactive protective colloid of claim 22 wherein d is 0.5–0.95.

24. The reactive protective colloid of claim 21 wherein e is in the range of 0.005–0.8.

25. The reactive protective colloid of claim 24 wherein e is 0.01–0.5.

26. The reactive protective colloid of claim 21 wherein f is in the range of 0–0.8.

27. The reactive protective colloid of claim 26 wherein f is 0.001–0.2.

28. The reactive protective colloid of claim 21 comprising at least 20 wt % of fluorine.

29. The reactive protective colloid of claim 28 comprising at least 50 wt % of fluorine.

30. A process for the preparation of a reactive protective colloid of Formula (I):

(I)

wherein:

m and n are independently natural numbers which are $\geq 1$;

Q and L together is a linking chain;

A is a reactive functional group; and

R is a low molecular weight, polymeric or oligomeric chain or a halogenated derivative thereof, which process comprises reacting a compound represented by

(IV)

with a compound represented by

(V)

in which R, L, A, m and n are as defined above, and X is a reactive group capable of reacting with a complementary reactive group Y to form a linking moiety Q.

31. The process of claim 30 wherein X and Y are independently —OH, —SH, I—, Br—, Cl—, —NH$_2$, =NH, carboxyl or derivatives thereof, acrylate, anhydride, isocyanate, isothiocyanate, amide or urea, provided that X and Y are complementary to each other to form a linking moiety.

32. The process of claim 31 wherein X is an ester group, Y is an amino group and the linking moiety formed is an amide linkage.

33. The process of claim 31 wherein X is an alcohol group, Y is an isocyanate group and the linking moiety formed is an urethane linkage.

34. The process of claim 30 wherein said polymeric or oligomeric chain R is formed by radical, condensation, ring-opening or ionic polymerization.

35. The process of claim 30 wherein said polymeric or oligomeric chain R is formed by polymerization of olefinic monomers selected from the group consisting of vinyls, acrylates, methacrylates, styrenes, dienes, maleic anhydride and derivatives thereof.

36. The process of claim 35 wherein said monomers are perfluoroalkyl acrylates, perfluoroalkyl methacrylates, vinylfluoride, vinylidene fluoride, tetrafluoroethylene, or chlorotrifluoroethylene.

37. The process of claim 30 wherein said polymeric or oligomeric chain R is formed by polymerization of oxiranes, cyclic ethers, or aldehydes.

38. The process of claim 30 wherein said polymeric or oligomeric chain R is formed from modification of side chain(s) of a preformed polymer.

39. The reactive protective colloid of claim 1 which is represented by the formula:

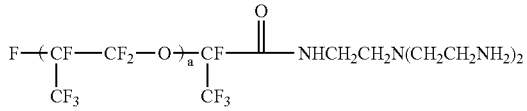

wherein a is the weight fraction of the unit in the polymeric chain, ranging from 0.8 to 0.995.

40. The reactive protective colloid of claim 1 represented by the formula:

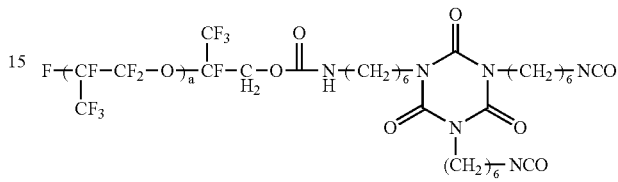

wherein a is the weight fraction of the unit in the polymeric chain, ranging from 0.8–0.995.

41. The reactive protective colloid of claim 1 wherein R is a halogenated low molecular weight group.

42. The reactive protective colloid of claim 41 wherein R is a fluorinated low molecular weight group.

43. The reactive protective colloid of claim 1 wherein R is a halogenated polymeric or oligomeric chain.

44. The reactive protective colloid of claim 43 wherein R is a fluorinated polymeric or oligomeric chain.

45. The process of claim 35 wherein said derivative is a fluorinated derivative.

46. The process of claim 37 wherein said oxiranes or cyclic ethers are selected from the group consisting of ethylene oxide, propylene oxide, tetrahydrofuran, tetrafluoroethylene oxide, perfluoropropylene oxide and perfluorofuran.

47. The process of claim 37 wherein said aldyhyde is trifluoroacetaldehyde.

* * * * *